Patented June 30, 1936

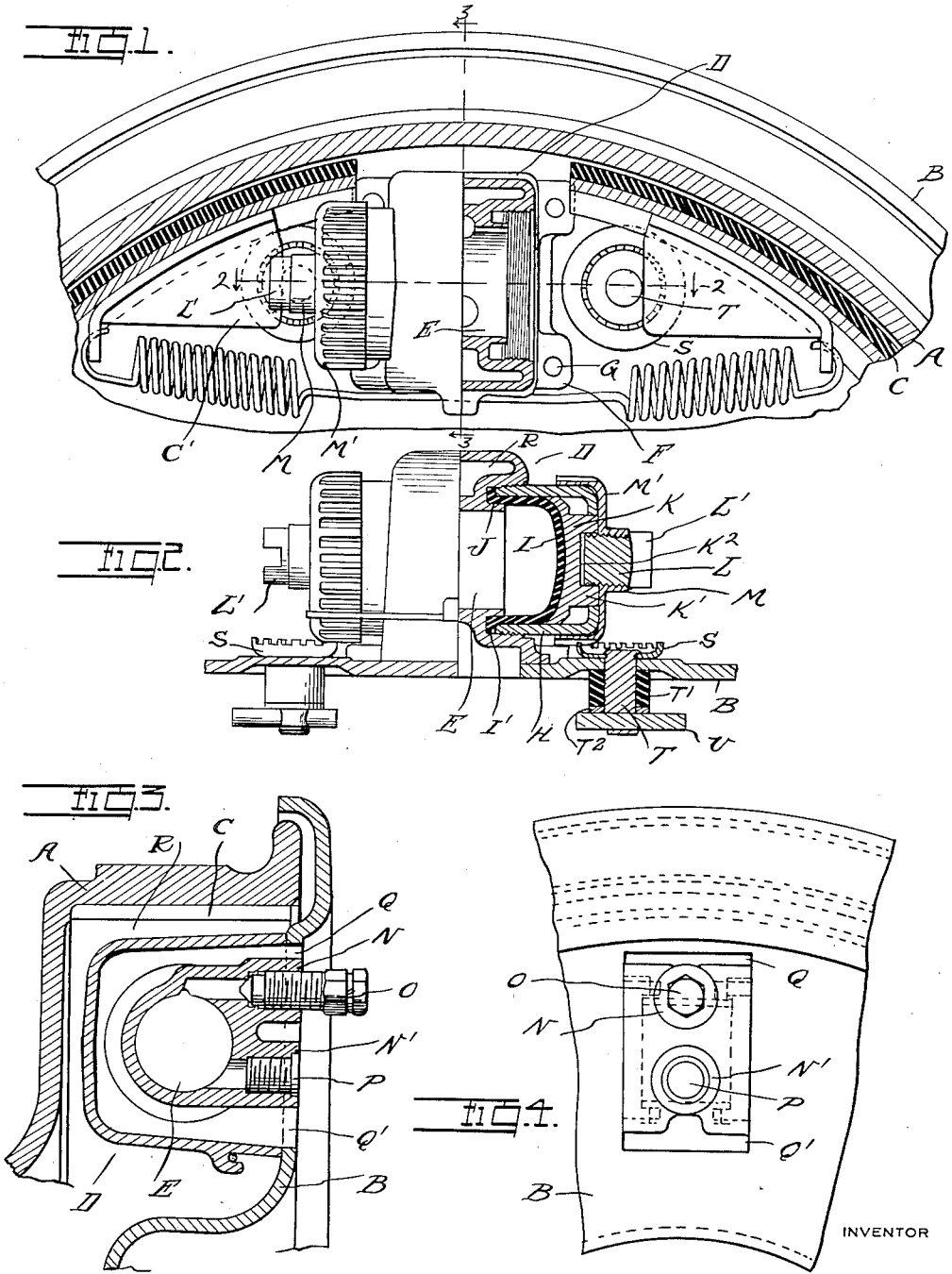

2,046,140

UNITED STATES PATENT OFFICE 2,046,140

BRAKE MECHANISM

John William White, Detroit, Mich., assignor, by mesne assignments, to General Motors Corporation, a corporation of Delaware Application March 26, 1934, Serial No. 717,489

4 Claims. (Cl. 188—152)

The invention relates to brake mechanisms and more particularly to hydraulic actuators for the brake friction means. It is the object of the invention to obtain a construction of hydraulic actuator which is mounted on the brake head within the brake drum and which at the same time is protected from the heat generated by the application of the brake. The invention therefore consists in the novel construction as hereinafter set forth.

In the drawing:

Fig. 1 is a sectional elevation showing the mounting of the actuator upon the brake head;

Fig. 2 is a section partly in elevation on line 2—2 of Fig. 1;

Fig. 3 is a cross section on line 3—3, Fig. 1;

Fig. 4 is a rear elevation of the brake head illustrating the means of ventilating the jacket surrounding the hydraulic actuator.

As illustrated, A is the revoluble brake drum and B is the stationary head on which the brake mechanism is mounted within the drum. This head is so fashioned as to form within the drum an annular chamber in which are located the brake shoes or other brake friction means C, and the hydraulic actuator D arranged therebetween. The fluid used in the hydraulic actuator has certain volatile constituents and consequently where the heat within the drum due to the application of the brakes becomes excessive, there is danger of vaporizing these constituents and thereby interfering with the proper functioning of the actuator. To avoid this difficulty I have devised a construction in which the fluid containing cylinder of the actuator is surrounded by a jacket, the air space within said jacket being in communication with the air outside the drum so as to cause the circulation of cooling air current therethrough.

In detail, E is a hollow annulus provided on opposite sides with ears F for attaching the same to the head B by suitable bolts G. H are cup-shaped cylinder members having a threaded engagement with the opposite ends of the annulus E. I are flexible cups, preferably formed of rubber, which are arranged inside the cylinders H and are provided with outwardly extending flange portions I' which are clamped between the ends of the cylinders H and an annular recess J in the member E. K are pistons slidably secured within the cylinders H having concave faces for receiving oblate spheroidal ends of the cups I and conforming to the shape thereof. At their outer ends the pistons K have stem portions K' which slidably engage apertures in the ends of the cylinder cups H. These stems are also recessed at $K^2$ to receive a threaded stud L, the outer end L' of which is bifurcated to embrace an abutment flange C' on the brake shoe C. M is a nut engaging the threaded stud L and bearing against the end of the stem K'. This nut is also provided with an outwardly extending cupped flange M' which surrounds the end of the cylinder H.

With the construction as thus far described, it will be understood that if fluid under pressure is introduced into the space within the annulus E and cups I, these cups will be elongated, moving the pistons K outward and with them the studs L and brake shoes C, thereby applying the brake. The fluid is introduced through a nipple N extending to the rear and through an aperture in the head B where it is connected through a coupling O to the conduit leading from the master cylinder. A second nipple N' normally closed by a plug P forms a means for bleeding the air from the cylinder when the fluid is first introduced therein. Above and below the nipples N and N' are apertures Q and Q' through the head B and communicating with the air space R within the hollow annulus E. Thus when the heat developed by the application of the brake raises the temperature of the air within the brake drum, the hollow annulus E forms an insulating means between this heated air and the fluid within the cylinder. Furthermore, any heat passing through the outer wall of the annulus and communicated to the air therewithin, will induce a thermal circulation, expelling the heated air through the aperture Q and drawing in cold air through the aperture Q'. In this way the heat is rapidly dissipated so that the inner wall of the cylinder and the fluid contained therein are kept at a temperature below the vaporizing point of any of the fluid constituents.

The construction above described is one which can be easily applied to any brake head without complication in the structure thereof. It is also one adapted to be used in connection with adjustment means operable from outside the drum. This adjustment means is not a part of the present invention but as illustrated comprises gear teeth on the outer face of the cupped flange M' which engage a crown gear S secured to a rotatable stud T passing through an aperture in the head B. At its outer end the stud T has a crank handle U by means of which it may be turned, thereby imparting rotation to the flange M' and nut M and adjusting the latter with respect to the stud L.

The parts are held in adjusted position by suitable means such as a rubber sleeve T" surrounding the stud T, bearing at one end against the head B and at its opposite end against the handle U with an intervening washer T².

What I claim as my invention is:

1. The combination with a brake drum, a brake head forming a closure for said drum and brake friction means mounted on said head within said drum, of a hydraulic actuator for said brake friction means, said actuator comprising a hydraulic wheel cylinder and a jacket surrounding and spaced from the cylinder forming an air space in communication with the atmosphere.

2. The combination with a brake drum, a brake head forming a closure for said drum and brake friction means mounted on said head within said drum, of a hydraulic actuator for said brake friction means provided with hollow walls and means establishing communication through said head between the space within said hollow walls and the air external to said drum.

3. The combination with a brake drum, a brake head and brake friction means mounted on said head within said drum, of a hydraulic actuator for said brake friction means comprising an annulus having hollow walls, cylinders secured to and projecting oppositely from said annulus, pistons in said cylinders, connecting means between said pistons and said brake friction means, and means for establishing communication between the space within said hollow walls and the air external to said drum.

4. The combination with a brake drum, a brake head and brake friction means mounted on said head within said drum, of a hydraulic actuator for said brake friction means comprising an annulus having hollow walls mounted on said brake head, cylinders with cupped ends having a threaded engagement with said annulus, resilient cups within said cylinders clamped to said annulus thereby, pistons in said cylinders having concaved ends for receiving said cups, connecting means between said pistons and said brake friction means, and means establishing communication between the space within said hollow annulus and the air external to said drum.

JOHN WILLIAM WHITE.